US009201295B2

(12) United States Patent (10) Patent No.: US 9,201,295 B2
Morejon et al. (45) Date of Patent: Dec. 1, 2015

(54) HIGH EFFICIENCY LED OPTICAL ENGINE FOR A DIGITAL LIGHT PROCESSING (DLP) PROJECTOR AND METHOD OF FORMING SAME

(75) Inventors: Israel J. Morejon, Tampa, FL (US); Jinhui Zhai, Clearwater, FL (US); Haizhang Li, Orlando, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 2814 days.

(21) Appl. No.: 11/101,737

(22) Filed: Apr. 8, 2005

(65) Prior Publication Data

US 2006/0164600 A1 Jul. 27, 2006

Related U.S. Application Data

(60) Provisional application No. 60/646,779, filed on Jan. 25, 2005.

(51) Int. Cl.
| | |
|---|---|
| G03B 21/00 | (2006.01) |
| G03B 21/28 | (2006.01) |
| G02B 27/10 | (2006.01) |
| G02B 27/14 | (2006.01) |
| H04N 9/31 | (2006.01) |

(52) U.S. Cl.
CPC ............ *G03B 21/28* (2013.01); *G02B 27/1033* (2013.01); *G02B 27/145* (2013.01); *G02B 27/149* (2013.01); *H04N 9/315* (2013.01); *H04N 9/3144* (2013.01)

(58) Field of Classification Search
USPC ......... 353/31, 33, 34, 37, 81, 82, 98, 99, 102; 349/5, 7, 8; 359/34, 618, 629, 636, 359/638–641; 362/551, 555, 561, 611, 612, 362/227, 800; 385/15, 33, 34, 133
See application file for complete search history.

(56) References Cited

U.S. PATENT DOCUMENTS

| | | | | |
|---|---|---|---|---|
| 4,754,272 | A | * | 6/1988 | Illenberg et al. ......... 340/815.67 |
| 5,420,444 | A | | 5/1995 | Sawase et al. |
| 5,680,180 | A | | 10/1997 | Huang |
| 6,220,714 | B1 | | 4/2001 | Eguchi |
| 6,224,216 | B1 | | 5/2001 | Parker et al. |
| 6,591,022 | B2 | | 7/2003 | Dewald |
| 6,644,817 | B2 | | 11/2003 | Kuroda et al. |
| 6,767,100 | B1 | | 7/2004 | Long et al. |
| 6,830,343 | B2 | | 12/2004 | Song |
| 6,916,097 | B2 | * | 7/2005 | Omoda et al. ................... 353/31 |
| 7,040,767 | B2 | * | 5/2006 | Lee et al. ......................... 353/99 |
| 7,212,344 | B2 | * | 5/2007 | Keuper et ..................... 359/618 |
| 2003/0090632 | A1 | * | 5/2003 | Kim et al. ......................... 353/31 |
| 2005/0036119 | A1 | * | 2/2005 | Ruda et al. ....................... 353/99 |

(Continued)

OTHER PUBLICATIONS

Evan Powell, The Great Technology War: LCD vs. DLP, Projector Central web site, Jul. 7, 2003, pp. 1-6.

*Primary Examiner* — Rochelle-Ann J Blackman
(74) *Attorney, Agent, or Firm* — Price Heneveld LLP

(57) ABSTRACT

An optical light engine (100) includes one or more light-emitting diode (LED) panels (101, 102, 103) that are combined into a common path and directly imaged onto panel device to provide a source of light to a microdisplay panel (109). Preferably, the LED panel (101, 102, 103) is shaped such that the aspect ratio of light propagating the LED panel is substantially equal to the light received at the microdisplay panel (109). An aspect ratio of 4:3 or 16:9 is typically selected in view of the sizes of the LED panels used in the light engine.

25 Claims, 10 Drawing Sheets

(56) References Cited

U.S. PATENT DOCUMENTS

| | | | |
|---|---|---|---|
| 2005/0051785 A1* | 3/2005 | Erchak et al. | 257/98 |
| 2005/0068504 A1* | 3/2005 | Trollsch et al. | 353/31 |
| 2005/0088625 A1* | 4/2005 | Imade | 353/31 |

* cited by examiner

HIGH EFFICIENCY LED OPTICAL ENGINE FOR A DIGITAL LIGHT PROCESSING (DLP) PROJECTOR AND METHOD OF FORMING SAME

CROSS-REFERENCE TO RELATED APPLICATION

Priority for this application is based upon Provisional Patent Application Ser. No. 60/646,779, filed Jan. 25, 2005, entitled High Efficiency LED Optical Engine for DLP Projector and assigned to Jabil Circuit, Inc.

FIELD OF THE INVENTION

This invention generally relates to an optical engine for a projector type display system and, more specifically, an optical engine with light-emitting diodes (LEDs) as light source used in connection with a digital micro-mirror device (DMD) based projection display system.

BACKGROUND OF THE INVENTION

In recent years, digital projection systems using spatial light valve modulators, including DMDs and transmissive liquid crystal display, have been receiving much attention. These types of systems provide a high standard of display performance including high resolution, high brightness and a high contrast ratio. The conventional DMD projection display system includes at least a light source, usually a high-pressure discharge lamp, a color wheel, a DMD, and an optical system. Most consumer DMD projectors employ color wheels to filter the incoming white light and provide sequential color light for illuminating the DMD panel. The color wheel devices are described in a numerous patents such as U.S. Pat. Nos. 5,680,180, 6,591,022, 6,767,100 and 6,830,343 which are herein incorporated by reference. One drawback of these types of prior art systems is that the color gamut of the projection system, with color wheel, is often limited due to the spectrum distribution of the white light source. Another inherent disadvantage is that the motor for driving the color wheel can be a source of ambient noise.

Additionally, short arc type discharge lamps such as mercury lamps, metal halide lamps and xenon lamps are widely used as the light source for the projection type display apparatus. However, there are some drawbacks with these types of short arc type discharge lamps. One of these is that all of the light except blue, green, and red will be filtered out resulting in a loss in efficiency. In addition, a fly-eye type of integrator or a light pipe optical integrator is required for collecting, homogenizing and guiding light from the light source. This has the effect of making the system very bulky and complex. Furthermore, there is a significant amount of ultraviolet (UV) and infrared (IR) light emitted from these lamps. The unfiltered UV light can work to reduce the operating lifetime of both the optical components and display panel in the system. The IR light can require means for providing additional cooling. To eliminate UV and IR light emitted from the lamp, UV/IR filters must be used that result in an increase in system complexity. Therefore, to avoid all aforementioned drawbacks of the previous illumination systems, it is desirable to devise an illumination apparatus that has an enhanced efficiency, prolonged lifetime, compact size and low cost to replace the short arc type discharge lamps used in current products.

Significant efforts have been dedicated towards utilizing light-emitting diodes (LEDs) in projection illumination systems as a light source. LEDs show great promise since they consume less power, release less heat, and can have a longer life time. The LEDs offer high light efficiency since all the spectrum of red, green and blue light from LEDs can be utilized. In addition, LEDs with three primary colors can produce a wider color gamut than conventional white lamps. An example of an LED light source having uniform light distribution can be found in U.S. Pat. No. 5,420,444.

Those skilled in the art will further recognize that light is not easily diffused using an LED-type light source and the output lumen power of an LED is generally much less than a short arc type discharge lamp. In practice, it is often a challenge to get a good uniform light beam from the LED source with the least amount of optical loss. Optical loss is typically caused by a fly-eye lens array or waveguides integrated into the projector illumination system. The prior art system as disclosed in U.S. Pat. No. 6,224,216 describes an embodiment of a triple path projector employing three single color LED arrays. These LED arrays emit light propagating along separated paths through fiber bundles to respective separated light pipe integrators and respective display devices. One disadvantage in this type of implementation is that the coupling between LEDs and fibers is often a problem. Practically, due to coupling and transmitting losses, it is difficult to efficiently couple light emitting from LED arrays to corresponding fiber bundles and light pipes.

In the invention described in U.S. Pat. No. 6,220,714, a projection system using LEDs for illumination is disclosed where light emitting from red, green and blue LEDs or LED arrays is collimated by condenser lenses. The light then propagates through fly-eye type of integrators for illuminating a single panel. Based on the geometry of the integrator lens, only the surface area of light-emitting region within a certain field of view can be effectively used for illuminating the panel. A similar system can be found in U.S. Pat. No. 6,644,814 that describes an LED-illumination-type DMD projector with one panel. Three sets of LED arrays are employed as light sources where three first fly-eye lenses are disposed in contact with respective red, green or blue LED arrays. The exit pupil of each element of the fly-eye lenses is illuminated by the LED array. A second fly-eye lens then forms images of the illuminated pupils of the first fly-eye lens and makes them overlapped on the DMD panel. The main problem with this system is that some light from the LEDs cannot enter the corresponding lens of the first and second fly-eye lenses due to aberration and aperture limitation of lens arrays. Thus, a portion of illumination light falls outside of the panel area resulting in low light efficiency and low contrast.

Accordingly, it has proven to be a challenge to provide an LED optical system for DMD projector that overcomes the shortcomings of the existing prior art LED illumination systems. The need exists to provide an optical light engine using LEDs that eliminate the use of a traditional homogenizer such as fly-eye lens arrays and integrator waveguides to avoid considerable optical loss. Furthermore, there is a need to provide an LED optical light engine system that offers advantages in compactness, simplicity and low cost.

The above and other features and advantages of the invention will be further understood from the following description of the preferred embodiments thereof, taken in conjunction with the accompanying drawings.

DETAILED DESCRIPTION

The present description is directed in particular to elements forming part of, or cooperating more directly with, apparatus in accordance with the invention. As will be understood by those familiar with the art, aspects of the invention may be embodied in other specific forms without departing from the scope of the invention as a whole. Accordingly, the disclosures and descriptions herein are intended to be illustrative, but not limiting, of the scope of the invention which is set forth in the following claims.

Figure 1:
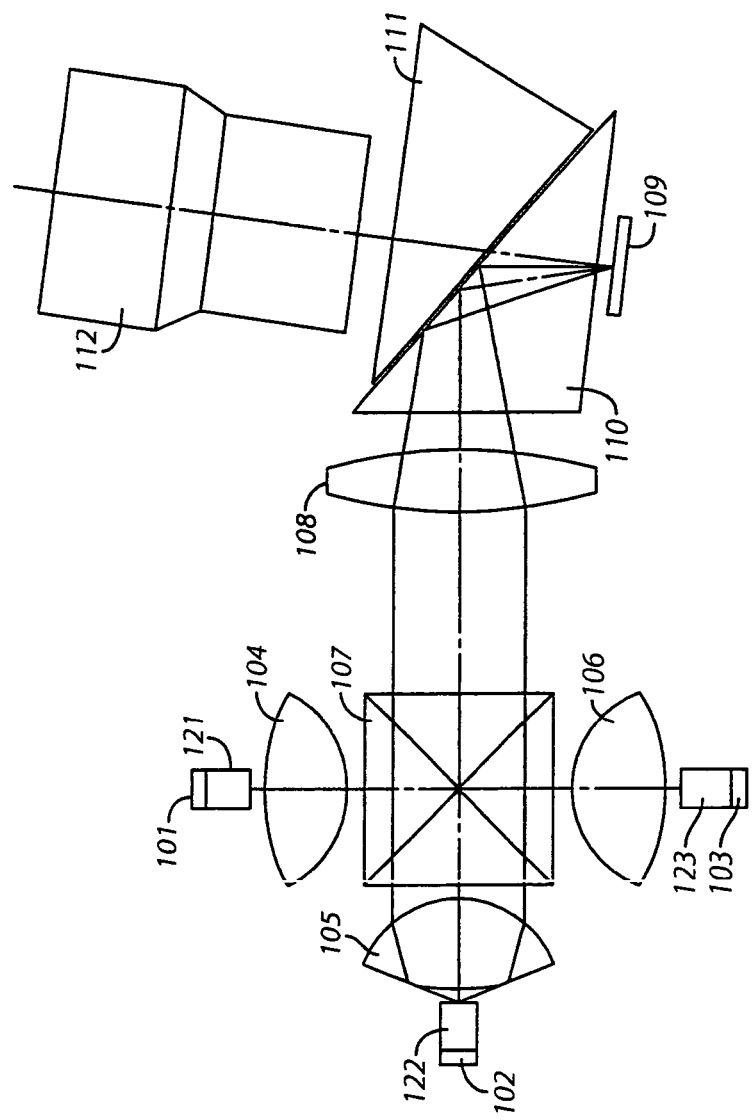
FIG. 1 is a block diagram illustrating an embodiment of the LED optical engine for DMD application in accordance with preferred embodiment of the invention.

FIG. 1 is a block diagram for illustrating the schematic configuration of a red, green and blue (RGB) LED optical engine for a digital micro-mirror device (DMD) based image presentation or projection device, such as a rear projection television or front projector, according to the preferred embodiment of the invention. This embodiment of the optical engine comprises a substantially red LED panel 101, a substantially green LED panel 102, a substantially blue LED panel 103, and a first light coupling structure comprising a first collimation lens 104, a second collimation lens 105, a third collimation lens 106, a cross-dichroic combiner 107, a condenser lens 108, that couples light from the LEDs to a DMD panel 109. A second light coupling structure comprising a first prism 110, a second prism 111, and a projection lens 112, couples light from the DMD panel 109 to a presentation screen (not shown). The light beams emitting from red LED panel 101, green LED panel 102 and blue LED panel 103 are collimated by lenses 104, 105 and 106, respectively, where they each enter the three entrance surfaces of the cross-dichroic combiner 107. In the preferred embodiment, each LED panel 101, 102, 103 is formed from a single light-emitting diode having a shape corresponding to a light-emitting aspect ratio of 16:9 or 4:3. However, in alternative embodiments, multiple light-emitting diodes may be arranged into an array or otherwise combined to form the LED panel of the desired aspect ratio. The light from the red LED and blue LED is reflected from the cross-dichroic combiner 107 while the light from green LED propagates through the combiner without an increase in etendue. The red, green and blue axes are coincident on the exit side of the cross-dichroic combiner 107. The light beams exiting from the cross-dichroic combiner 107 thereby go through the condenser lens 108, reflected by the first prism 110 to form images of light source 101, 102 and 103 on the DMD panel 109. LED panels 101, 102 and 103 may include optical waveguides 121, 122 and 123, directly connecting to the LED integrated circuit chip. These optical waveguides work to homogenize the light source before images are formed onto DMD panel 109. This homogenized light works with a first prism 110, for combining the total internal reflections of the combined RGB light at the reflection surface to increase overall light engine efficiency. The light from the LED panels is synchronized with on/off signals of the pixels on the DMD panel. The light reflected from the DMD panel 109 goes through the first prism 110 and second prism 111, and is then projected by the projection lens 112 onto a screen (not shown). In this manner, the DMD panel 109 operates in correspondence with the LED panels 101, 102, 103 to generate a sequence of images.

In contrast to the optical engines of the prior art, the red, green and blue LED panels 101, 102, 103 as used in the preferred embodiment of the invention are manufactured of a shape or dimension proportional to that of the DMD panel 109, which typically has an aspect ratio of 16:9 or 4:3. The LED panel also has a corresponding aspect ratio of either 16:9 or 4:3 that is coordinated to a field stop or other devices used in the illumination path. Hence, a 1:1 correspondence is provided such that the aspect ratio at the LED panel and the illumination path is equivalent to the aspect ratio of illuminating beam on the DMD panel 109. In other words, the light output from the LEDs is directly imaged onto the DMD panel 109. In addition, the LEDs used in the preferred embodiment of the invention are made substantially uniform. If a specific LED panel is comprised of an array of substantially uniform sub-light sources, then each LED panel is made such that the gaps between sub-light sources are minimized.

Figure 5B:
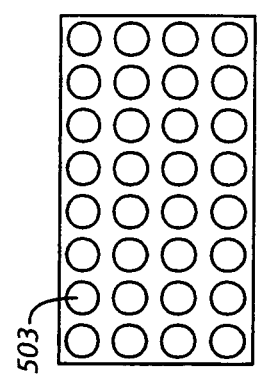
FIGS. 5(A)-5(D) are diagrams showing different embodiments of an LED panel in accordance with the invention.
Figure 5D:
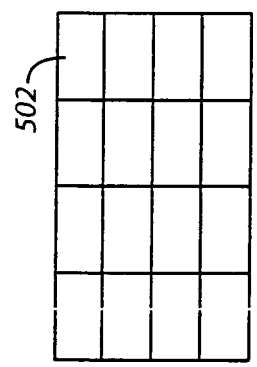
Figure 5A:
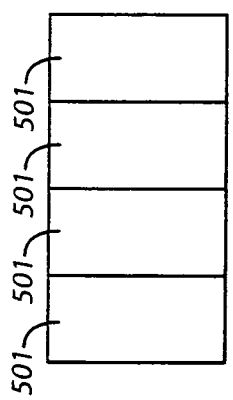
Figure 5C:
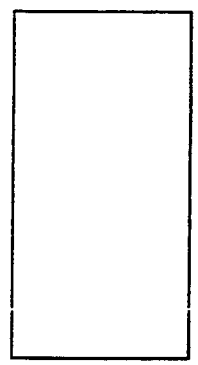

FIGS. 5(A)-5(D) depict four diagrams with the different embodiments of an LED panel. The LED panel shown in FIG. 5(A) is made substantially uniform with an aspect ratio proportional to that of the DMD panel to be illuminated. FIG. 5(B) illustrates an LED panel comprised of four sub-light sources of stripe shape 501. The actual number and shape of the stripe sub-light source 501 can be varied while the gaps between the stripes 501 are made to be minimized. FIG. 5(C) shows another embodiment of an LED panel according to the preferred embodiment of the invention where the LED panel is comprised of multiple sub-light sources of a rectangular shape 502. In this embodiment, 16 sub-light sources 502 are shown in a four-by-four matrix. Those skilled in the art will recognize that the actual number and shape of the rectangular sub-light source 502 may be varied with the spaces or gaps between the rectangles 502 minimized as much as possible. FIG. 5(D) shows yet another embodiment of an LED panel according to the preferred embodiment of the invention where the LED panel is comprised of multiple sub-light sources of circular shape 503. In general, the sub-light source of the rectangular shape is preferred over the circular shape in FIG. 5(D) since the gaps between the sub-light sources can be made smaller as compared with rectangular configurations. As discussed in FIG. 1, those skilled in the art will recognize that another way to obtain a uniform light source using an LED chip with gaps and/or other features is to integrate an optical waveguide directly onto the top of the chip. The waveguide is used to homogenize the light source by multi-reflection on the wall of the waveguide while the light source is homogenized at the output of waveguide. The waveguide output will have the same aspect ratio as the DMD panel. The space between LED chip and waveguide input is controlled to provide a minimum gap in order to avoid light leakage between the LED optical waveguide coupling.

Figure 6:
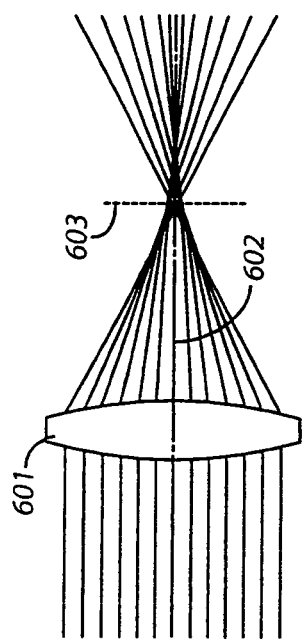
FIG. 6 is a diagram illustrating a lens with spherical aberration.

FIG. 6 is a diagram illustrating a lens 601 that uses a uniform illumination technique generally referred to as "spherical aberration." As will be recognized by those skilled in the art, the optical engine as defined herein uses no traditional light integrators such as a fly-eye lens arrays or the traditional integrator pipes. Instead, uniform illumination is realized through the introduction of aberration and/or defocusing. Aberrations are the failure of an optical system to produce a point image from a point object. As seen in FIG. 6, light rays that are close to the optical axis 601 focus at a position further away from the lens 601 than other light rays. As the light ray height from the optical axis 602 increases, the rays in image space focus closer and closer to the lens 601. The use of spherical aberration is known for this variation of focus position with aperture. When the observation plane 603 moves the blur size of image of the point source changes accordingly. The aberration shown in FIG. 6 is produced for a beam parallel to the optical axis.

Figure 7:
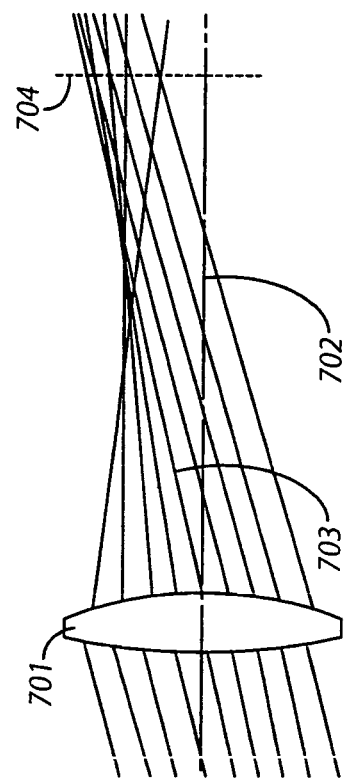
FIG. 7 is a diagram showing a lens with coma aberration.

FIG. 7 shows a situation when the illumination beam is tilted with a small angle to the lens axis 702. If there were no spherical aberration, all rays would come to the same focus in the paraxial plane 704, but focuses of different zone would have different offsets from the chief ray 703. The spot diagram on plane 704 looks like an ice cream cone and the aberration is called coma. Hence with regard to the embodiment as shown in FIG. 1, for the green optical path, the collimation lens 105 and the condenser lens 108 are selected such that substantial aberration (dominated by spherical aberration, coma and astigmatism) exists and the gaps between the sub-light sources on the LED panel become invisible on the DMD panel 109. This results in a uniform illumination of the DMD panel 109. It is critical that the gaps between the sub-light sources are minimized and the illumination optics (including collimation lens 105, cross-dichroic combiner 107, condenser lens 108 and first prism 109) have substantial residual aberration. The optical properties of the red and blue optical paths should be like those of the green optical path.

Figure 2:
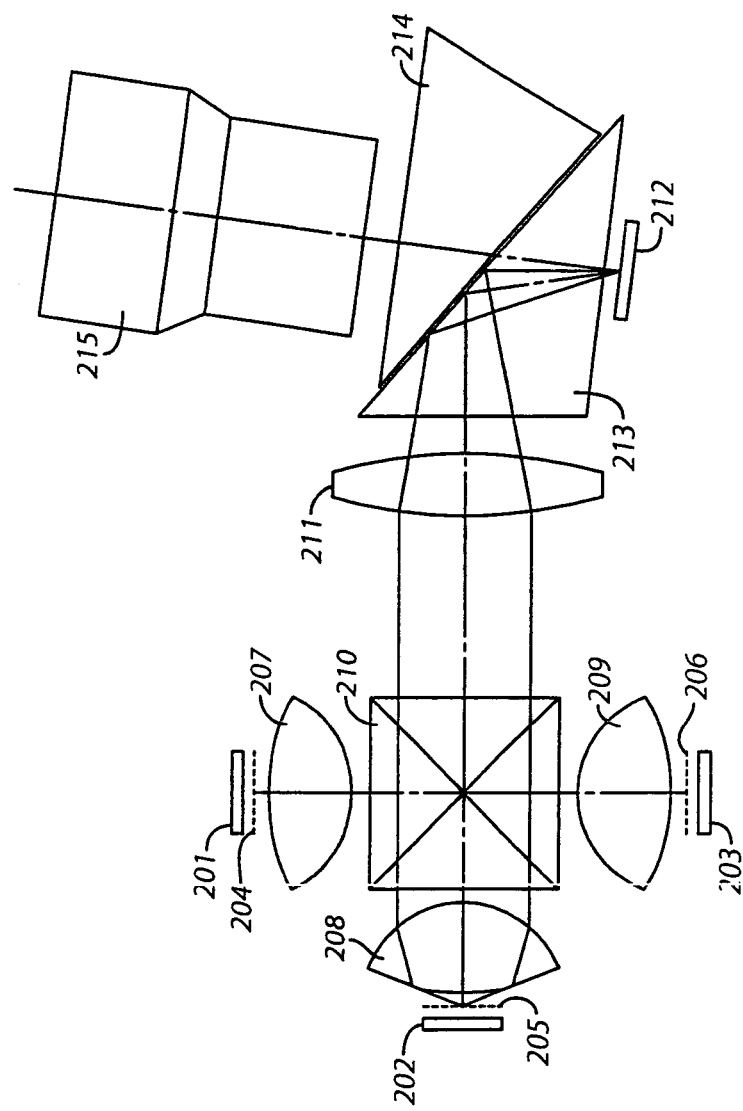
FIG. 2 is a block diagram illustrating another embodiment of an LED optical engine with defocused LED panels for DMD application in accordance with another embodiment of the invention.

FIG. 2 shows another embodiment of the optical engine according to the invention where red, green and blue LED panels are defocused to realize uniform illumination of a DMD panel. The optical engine comprises a red LED panel 201, a green LED panel 202, a blue LED panel 203, a first collimation lens 207, a second collimation lens 208, a third collimation lens 209, a cross dichroic combiner 210, a condenser lens 211, a DMD panel 212, a first prism 213, a second prism 214, and a projection lens 215. The object position of the DMD panel 212 is marked with dotted line of 204, 205 and 206 for the red, green and blue optical paths, respectively. The red, green and blue LED panels are configured at a defocus distance away from the planes of 204, 205 and 206. Similar to the effect of spherical aberration, the configuration of defocusing makes a point source on the LED panel and produces a blur spot on the DMD panel, resulting uniform illumination of the DMD panel. In practice, the optical system in the optical engine can have a substantial spherical aberration and be defocused.

Figure 3:
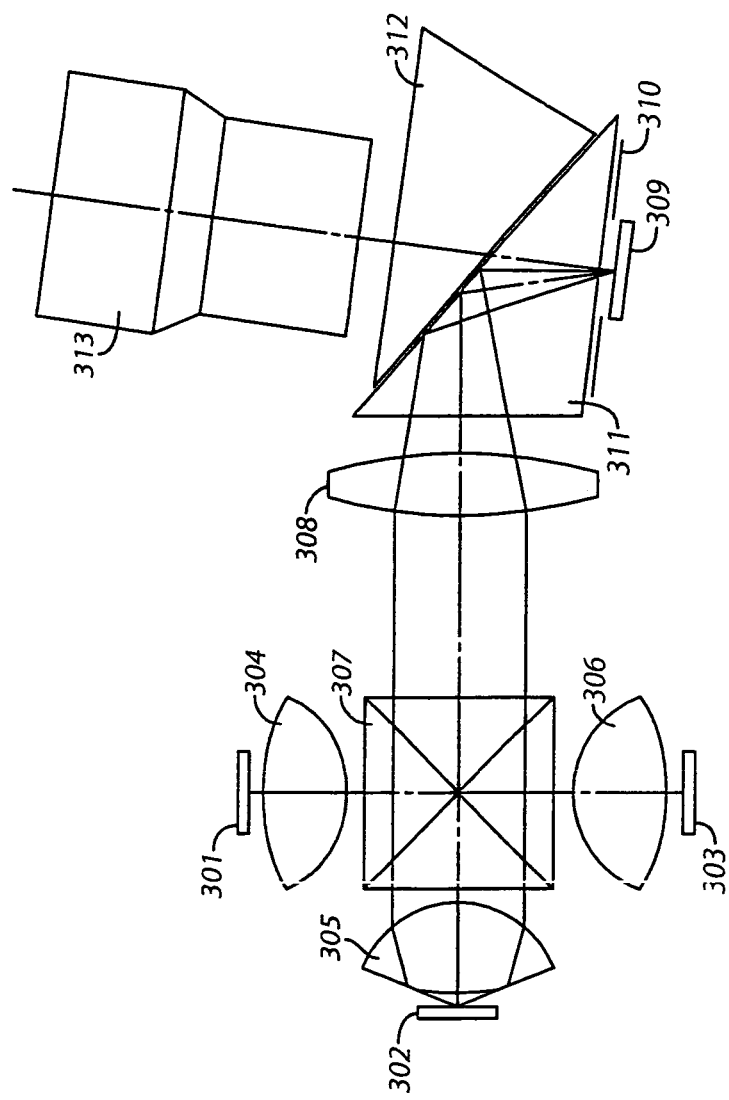
FIG. 3 is a block diagram illustrating yet another embodiment of an LED optical engine for DMD application that includes a field stop in front of the DMD.

FIG. 3 illustrates an alternative embodiment where the optical engine as shown in FIGS. 1 and 2 is further improved by including a field stop 310. As compared with FIG. 1, the field stop 310 is placed in front of DMD panel 309. The field stop 310 attenuates unwanted light near the edges of the illuminated area of the DMD panel 309 and prevents stray light from entering the projection lens (not shown) to increase the contrast ratio on the projection screen. Moreover, the field stop 310 also prevents the illumination light from shedding into the driving circuit board surrounding the DMD panel. This results in a lower cooling requirement and longer circuit board life.

Figure 4:
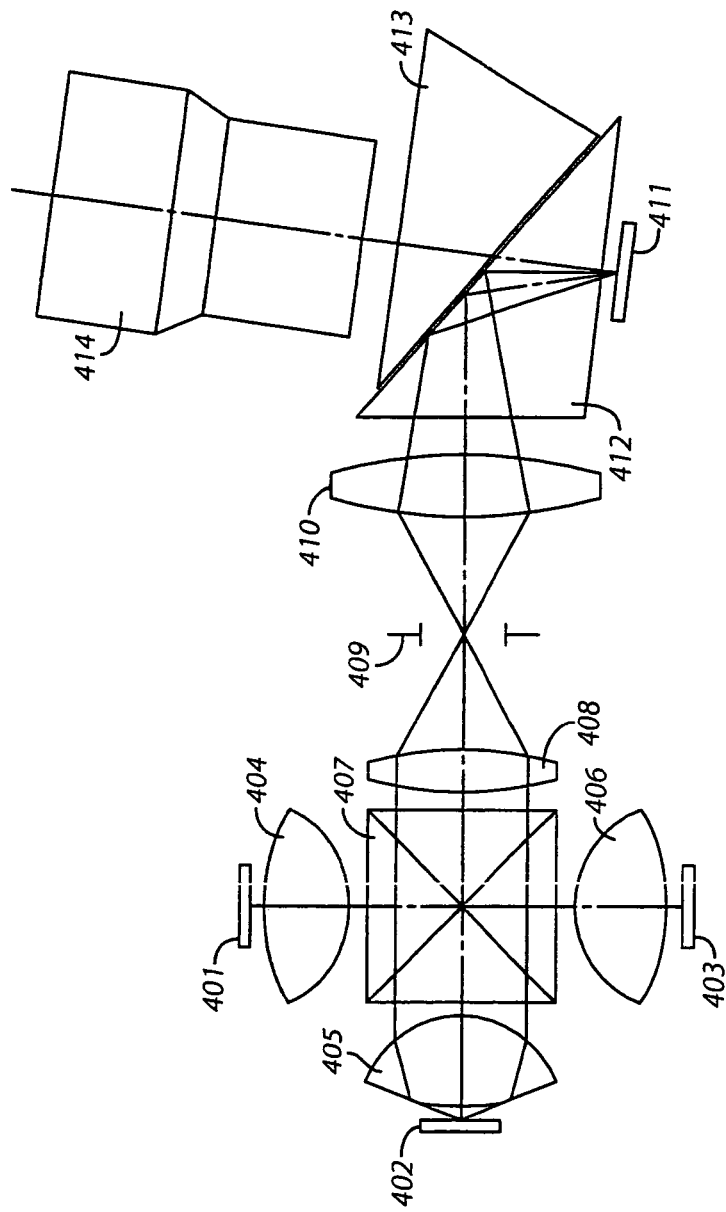
FIG. 4 is a block diagram illustrating yet another embodiment of an LED optical engine for DMD application that includes a field stop and a second condenser lens.

The optical engine shown in FIG. 4 comprises a red LED panel 401, a green LED panel 402, a blue LED panel 403, a first collimation lens 404, a second collimation lens 405, a third collimation lens 406, a cross dichroic combiner 407, a first condenser lens 408, a field stop 409, a second condenser lens 410, a DMD panel 411, a first prism 412, a second prism 413, and a projection lens 414. Compared with the embodiment shown in FIG. 1, a field stop 409 and a second condenser lens 410 are added into the illumination path. The combined light exiting from the cross-dichroic combiner 407 is focused by the first condenser lens 408, forming blurred images of the red, green and blue LED panels near the plane where the field stop 409 is located. The second condenser lens 410 then projects the field stop 409 onto the DMD panel 411. The aspect ratio of the field stop 409 is proportional to that of DMD panel 411. The lights from the red, green and blue LED panels are synchronized with on/off signals of the pixels on the DMD panel. The light reflected from the DMD panel 411 goes through the first prism 412 and second prism 413, and is then projected by the projection lens 414 onto the screen (not shown).

Figure 8:
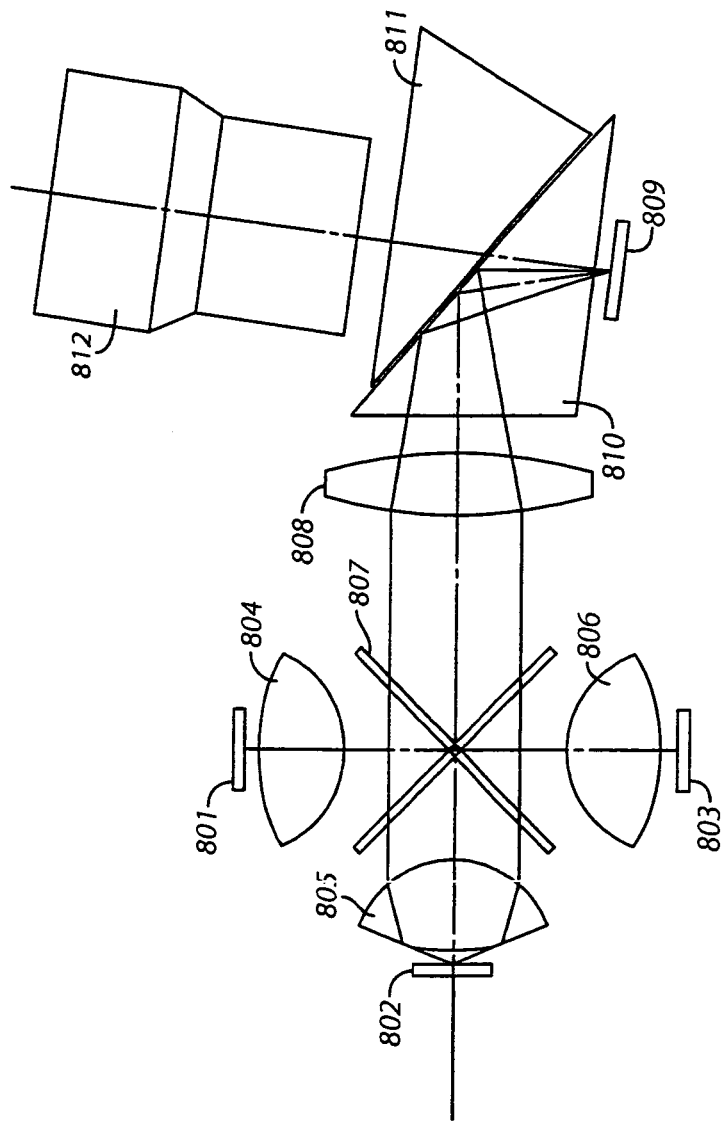
FIG. 8 is a block diagram illustrating another embodiment of an LED optical engine for DMD application where the dichroic combiner is an X-type plate assembly.
Figure 9:
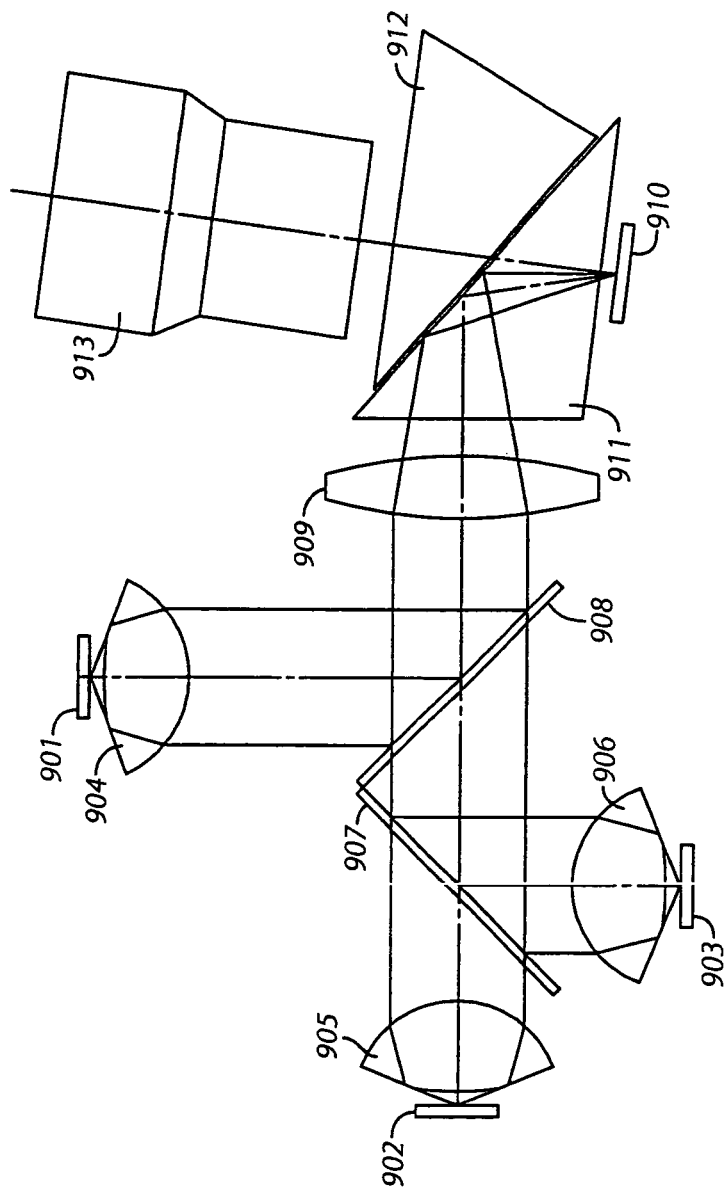
FIG. 9 is a block diagram illustrating another embodiment of an LED optical engine for DMD application where the dichroic combiner is a V-type plate assembly.
Figure 10:
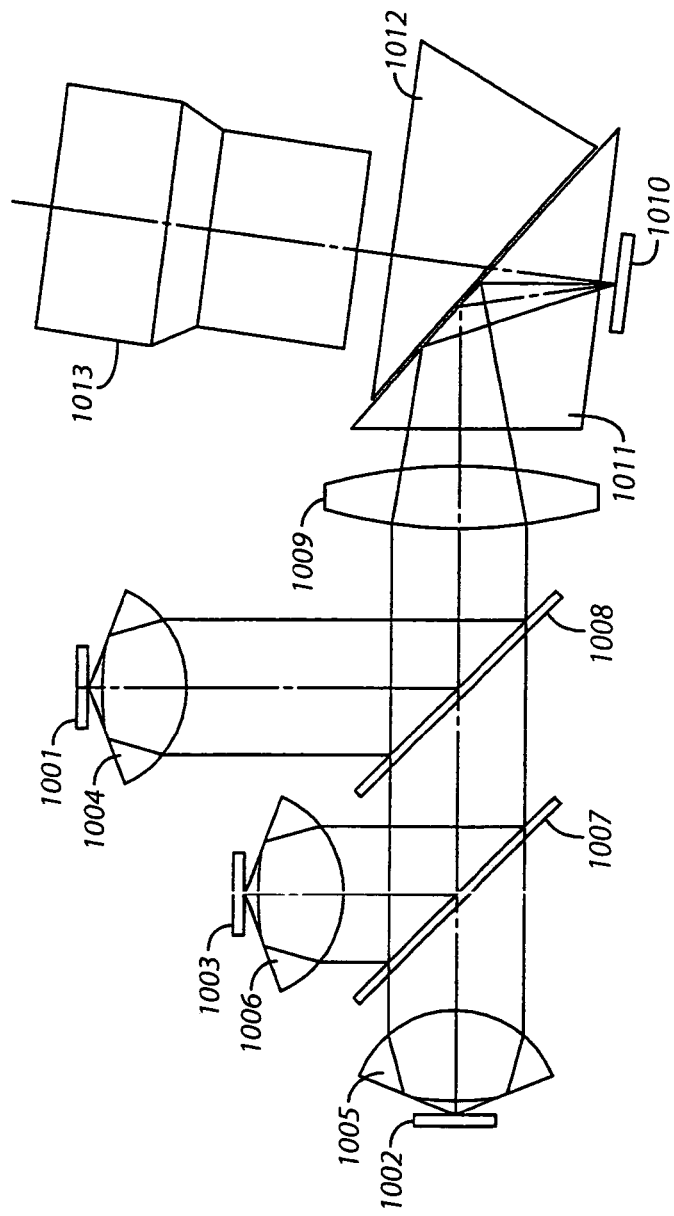
FIG. 10 is a block diagram illustrating another embodiment of an LED optical engine for DMD application where the dichroic combiner is a pair of parallel plates.

FIGS. 8-10 are block diagrams illustrating alternative embodiments of an LED optical engine for DMD application where the dichroic combiner is an X-type plate assembly, V-type dichroic plates or parallel dichroic plates, respectively. Although the dichroic combiner 107 in FIG. 1 is presented as a prism type, in practice, it can be an X-type dichroic plate assembly 807 as shown in FIG. 8, or a pair of V-type dichroic plates 907 and 908 as shown in FIG. 9, or a pair of parallel dichroic plates 1007 and 1108 and as shown in FIG. 10. Those skilled in the art will recognize that the dichroic plate configuration usually has lower cost as compared with a crosstype dichroic combiner prism. The embodiment of the optical engine shown in FIG. 8 comprises a red LED panel 801, a green LED panel 802, a blue LED panel 803, a first collimation lens 804, a second collimation lens 805, a third collimation lens 806, an X-type dichroic plate assembly 807, a condenser lens 808, a DMD panel 809, a first prism 810, a second prism 811, and a projection lens 812. The light emitting from red LED panel 801, green LED panel 802 and blue LED panel 803 is collimated by lenses 804, 805 and 806, respectively. The light from the red LED and blue LED is reflected from the X-type dichroic plate assembly 807 while the light from green LED transmits through the X-plate assembly. The respective red, green and blue axes are coincident on the exit side of the X-type dichroic plate assembly 807 and propagate through the condenser lens 808. The combined beams are then reflected by the first prism 810 to form images of light sources 801, 802 and 803 on the DMD panel 809. Preferably, the optical path lengths from the red, green and blue LED panels to the DMD panel are substantially equal. The light from the LED panels is synchronized with on/off signals of the pixels on the DMD panel. The light reflected from the DMD panel 809 propagates through both the first prism 810 and second prism 811. It is then projected by the projection lens 812 onto the screen (not shown).

FIG. 9 illustrates yet another embodiment of the optical engine that includes a red LED panel 901, a green LED panel 902, a blue LED panel 903, a first collimation lens 904, a second collimation lens 905, a third collimation lens 906, a pair V-type dichroic plates 907 and 908, a condenser lens 909, a DMD panel 910, a first prism 911, a second prism 912, and a projection lens 913. The light emitting from green LED panel 902 is collimated by lens 905 where it then propagates through the dichroic plates 907 and 908. The light emitting from the blue LED panel 903 is collimated by lens 906 and is further reflected by the dichroic plate 907 where it passes through the dichroic plate 908. The light emitting from red LED panel 901 is collimated by lens 904 and is reflected from the dichroic plate 908. The red, green and blue axes are coincident before going through the condenser lens 909. The combined beams are then reflected by the first prism 911 to form images of the light sources 901, 902 and 903 on the DMD panel 910. Preferably, the optical path lengths from the red, green and blue LED panels to the DMD panel are substantially equal. The light from the LED panels is synchronized with on/off signals of the pixels on the DMD panel. The light reflected from the DMD panel 910 then propagates through the first prism 911 and second prism 912 where it is then projected by the projection lens 913 onto the screen (not shown).

FIG. 10 illustrates still yet another alternative embodiment of the optical engine that includes a red LED panel 1001, a green LED panel 1002, a blue LED panel 1003, a first collimation lens 1004, a second collimation lens 1005, a third collimation lens 1006, a pair parallel dichroic plates 1007 and 1008, a condenser lens 1009, a DMD panel 1010, a first prism 1011, a second prism 1012, and a projection lens 1013. The light emitting from green LED panel 1002, collimated by lens 1005 propagates through the dichroic plates 1007 and 1008. The light emitting from blue LED panel 1003 is collimated by lens 1006 and is then reflected by the dichroic plate 1007 where it passes through the dichroic plate 1008. The light emitting from red LED panel 1001 is collimated by lens 1004 and is reflected from the dichroic plate 1008. The red, green and blue axes are coincident before propagating through the condenser lens 1009. The combined beams are then reflected by the first prism 1011 to form images of light source 1001, 1002 and 1003 on the DMD panel 1010. Preferably, the optical path lengths from the red, green and blue LED panels to the DMD panel are substantially equal. The light from the LED panels is synchronized with on/off signals of the pixels on the DMD panel. The light reflected from the DMD panel 1010 goes through the first prism 1011 and second prism 1012 where it is then projected by the projection lens 1013 onto the screen (not shown). As will be recognized by those skilled in the art, the positions of the LED panels in each embodiment are interchangeable as needed. For example, in FIG. 9 the green, red and blue LEDs in positions of 901, 902 and 903 may all be interchanged. In such an example, the red beam will pass through the dichroic plates 907 and 908 while the green beam will be reflected from dichroic plate 908. The blue beam would retain its original path. All embodiments of light engines in the figures herein use prism pairs to separate the illumination axis and the projection axis.

Figure 11:
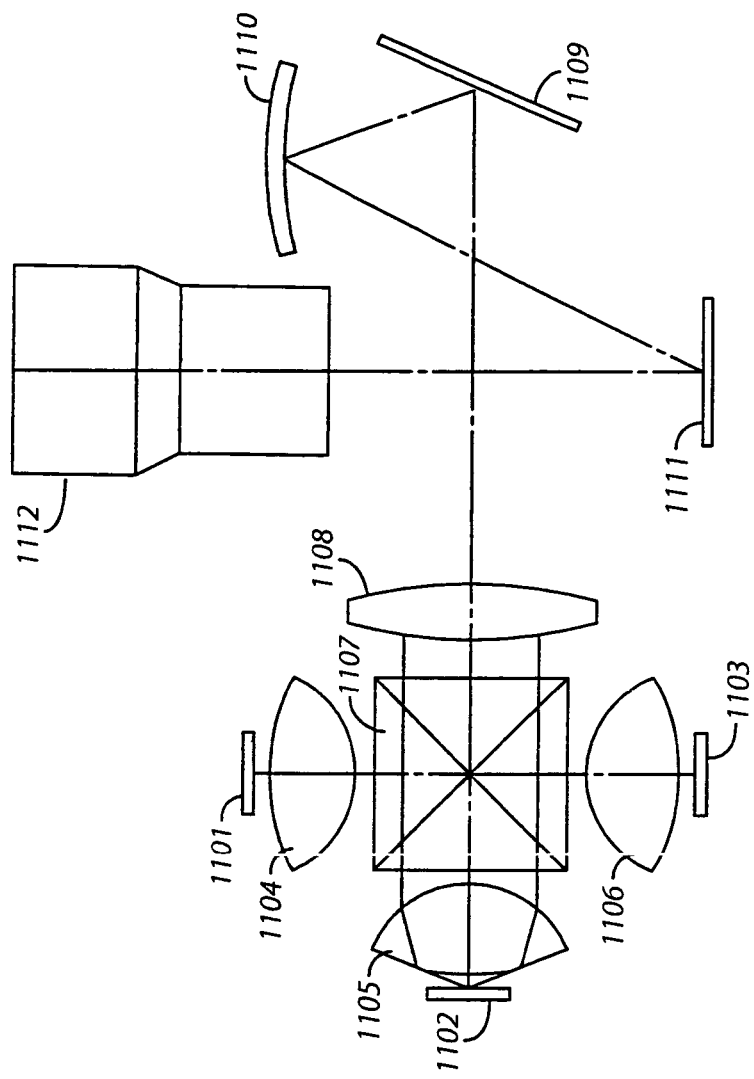
FIG. 11 is a block diagram showing another embodiment of an LED optical engine for DMD application where the prism pair in FIG. 1 is replaced by two reflecting mirrors.

FIG. 11 is a block diagram showing another embodiment of an LED optical engine for DMD application where the prism pair in FIG. 1 is replaced by two reflecting mirrors. This embodiment of the light engine system comprises a red LED panel 1101, a green LED panel 1102, a blue LED panel 1103, a first collimation lens 1104, a second collimation lens 1105, a third collimation lens 1106, a cross-dichroic combiner 1107, a condenser lens 1108, a first mirror 1109, a second mirror 1110, a DMD panel 1111, and a projection lens 1112. The light emitting from red LED panel 1101, green LED panel 1102 and blue LED panel 1103 is collimated by lenses 1104, 1105 and 1106, respectively, where they then enter the three entrance surfaces of the cross-dichroic combiner 1107. The light from the red LED and blue LED is reflected from the cross-dichroic combiner 1107 while the light from green LED propagates through the combiner. The combined light exiting from the cross-dichroic combiner 1107 is focused by the condenser lens 1108, the first reflector or reflecting mirror 1109, and the second reflector or reflecting mirror 1110. This forms blurred images from the red, green and blue LED panels on the DMD panel 1111. The DMD modulated light is then projected by the projection lens 1112 onto the screen (not shown). As noted herein, in each of the alternative embodiments shown in FIGS. 8-11, the red, green and blue LED panels may each include an integrating waveguide packaged on the top of the LED chip. The waveguide works to homogenize the LED light source that is directly imaged onto DMD panel without introducing any substantial aberration and/or defocusing to eliminate the gaps or other disparities on the LED chip.

In conclusion, the present invention provides for a highly efficient optical engine system for use in microdisplay projection applications, such as DMD based presentation devices. The use of the optical light engine in other types of microdisplay based applications, such as those employing liquid crystal display panels are contemplated. In the preferred embodiment, light from multicolored LED light sources is collimated through collimation lenses, combined using a dichroic combiner, and synchronized with the operation of a DMD panel. Preferably, a condenser lens is used for projecting the light from the LED light sources onto the DMD panel, and prisms are used for reflecting and transmitting the resulting DMD based image through a projection lens onto a presentation screen. By integrating the combiner in between the collimation lens and condenser lens, and by using this combination to directly image the LED onto the DMD panel, a compact light engine system is provided that has substantial efficiency. Other performance enhancements include residual aberration and defocusing techniques that are introduced to homogenize the light source from the LEDs. In an alternative embodiment, uniform illumination at the DMD panel is provided by directly integrating an optical waveguide onto the top of LEDs. One aspect of the present invention allows for the color gamut of the imaging to be greatly improved. Fly-eye lens arrays associated with traditional light integrator pipes and unwanted UV and IR light can be eliminated. This has the benefit of decreased heat and long operating life of the light source. As compared with prior art light engine systems, fans, complex bulky heat sinking apparatus and ballast circuit can also be eliminated. Moreover, normally required color wheel, driver circuit and stepper motors are also no longer needed, thereby reducing the overall cost and complexity of the projection system.

While the preferred embodiments of the invention have been illustrated and described, it will be clear that the invention is not so limited. Numerous modifications, changes, variations, substitutions and equivalents will occur to those skilled in the art without departing from the spirit and scope of the invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating a presentation image, comprising the steps of:
 operating a microdisplay panel device to generate a sequence of images;

operating a plurality of light-emitting diodes in correspondence with the operation of the microdisplay panel device, the plurality of light-emitting diodes each being operable to emit light having one of a plurality of colors;

collimating light from the plurality of light-emitting diodes;

combining the collimated light from the plurality of light-emitting diodes with a combiner into a common path;

condensing light from the combiner for presentation to the microdisplay panel;

for each of the plurality of light-emitting diodes, directly imaging light from each light-emitting diode onto the microdisplay panel device, such that an image of the light-emitting diode is formed on the microdisplay panel device, wherein such image is first processed in order by the steps of collimating, combining and condensing prior to being formed on the microdisplay device; and projecting the sequence of images generated at the microdisplay panel device.

2. The method of claim 1, wherein the step of combining comprises the step of processing the light from the plurality of light-emitting diodes through a dichroic combiner selected from the group of a cross type, X-type cross-dichroic plate assembly, V-type dichroic plate assembly or a pair of parallel dichroic plates.

3. The method of claim 2, further comprising the step of processing the light from the plurality of light-emitting diodes through a collimation lens prior to the step of combining.

4. The method of claim 2, further comprising the step of condensing light from the dichroic combiner prior to presentation of the light to the microdisplay panel device.

5. The method of claim 1, further comprising the step of homogenizing the light from the plurality of light-emitting diodes prior to presentation of the light to the microdisplay panel device.

6. The method of claim 5, wherein the step of homogenizing comprises the step of processing the light through a waveguide directly connected to each of the plurality of light-emitting diodes.

7. The method of claim 5, wherein the step of homogenizing comprises the step of defocusing light from the plurality of light-emitting diodes prior to presentation of the light to the combiner.

8. The method of claim 1, wherein microdisplay panel device has a particular aspect ratio, and the lighting emitting diodes are shaped to emit light with an aspect ratio corresponding to that of the microdisplay panel device, and further comprising the step of processing light from the light-emitting diodes to the microdisplay panel device in a manner that substantially maintains the aspect ratio for light generated by the light-emitting diodes.

9. The method of claim 1, where the step of directly imaging comprises the step of coupling light from each of the plurality of light-emitting diodes onto the microdisplay panel device such that there is no intervening image plane between each of the plurality of light-emitting diodes and the microdisplay panel device.

10. An image presentation device comprising:

a microdisplay panel, the microdisplay panel having a shape for presenting an image with a particular aspect ratio;

a plurality of light-emitting diodes (LEDs), each LED having a light-emitting surface shaped to generate light having an aspect ratio substantially similar to that of the microdisplay panel;

a combiner for combining the light from the plurality of LEDs into a common path for presentation to the microdisplay panel;

collimation apparatus disposed between each of the LEDs and the combiner, the collimation apparatus being shaped to maintain the aspect ratio for light generated by each LED between each LED and the combiner; and condenser apparatus disposed between the combiner and the microdisplay panel;

wherein the collimation apparatus, combiner, and condenser apparatus are arranged to directly image light from each of the plurality of light-emitting diodes directly through, in order, the collimation apparatus, combiner, and condenser apparatus and onto the microdisplay panel.

11. The image presentation device of claim 10, wherein the combiner comprises a dichroic combiner.

12. The image presentation device of claim 11, wherein the dichroic combiner is selected from the group of a cross type, X-type cross-dichroic plate assembly, V-type dichroic plate assembly or a pair of parallel dichroic plates.

13. The image presentation device of claim 12, wherein the collimation apparatus comprises a collimation lens positioned to defocus light from each of the plurality of LEDs.

14. The image presentation device of claim 10, further comprising a waveguide directly connected to each of the LEDs for homogenizing light generated therefrom.

15. The image presentation device of claim 10, wherein the plurality of LEDs includes a first LED operable to generate substantially red light, a second LED operable to generate substantially green light and a third LED operable to generate substantially blue light.

16. The image presentation device of claim 10, wherein the condenser apparatus comprises at least one condenser lens, and further comprising at least one reflector for reflecting light from the at least one condenser lens to the microdisplay panel.

17. The image presentation device of claim 16, wherein the at least one reflector includes a first prism and a second prism.

18. The image presentation device of claim 16, wherein the at least one reflector includes a first mirror and second mirror.

19. The image presentation device of claim 10, further comprising:

a reflector positioned between the combiner and the microdisplay panel;

a first condenser lens positioned adjacent to the reflector;

a second condenser lens positioned between the dichroic combiner and the first condenser lens; and at least one field stop positioned substantially between the first condenser lens and second condenser lens.

20. The device of claim 10, wherein there are no intervening optical elements between the collimation apparatus and the combiner or between the combiner and the condenser apparatus.

21. An image presentation device, comprising:

a microdisplay panel having a shape to provide a 16:9 aspect ratio for a projected image;

an optical light engine system, comprising a plurality of light-emitting diode (LED) panels each having a light-emitting surface with a shape having a 16:9 aspect ratio;

a dichroic combiner disposed between the plurality of LED panels and the microdisplay panel, and operable to combine light from the plurality of LED panels into a common light path;

collimation lens for generating collimated light from the plurality of LED panels;

condenser lens for focusing light from the combiner onto the microdisplay; and wherein light from the plurality of LED panels is coupled to the microdisplay panel with a light coupling structure in a manner such that the aspect ratio of light propagating from each of the plurality of LED panels is substantially equal to that of the light received at the microdisplay panel, and such that light from the plurality of LEDs is directly imaged, in order, through the collimation lens, the dichroic combiner, and the condenser lens, and onto the microdisplay panel.

22. The image presentation device of claim 21, further comprising a waveguide coupled to at least one LED panel for homogenizing light from the at least one LED panel.

23. The image presentation device of claim 21, further comprising:
a reflector disposed between the dichroic combiner and the microdisplay panel;
a first condenser lens positioned adjacent to the reflector;
a second condenser lens positioned between the dichroic combiner and the first condenser lens; and
at least one field stop positioned substantially between the first condenser lens and second condenser lens for eliminating stray light directed to the microdisplay panel.

24. The image presentation device of claim 21, wherein the microdisplay panel comprises a digital micro-mirror device.

25. The device of claim 21, wherein there are no intervening optical elements between the collimation lens and the combiner or between the combiner and the condenser lens.

* * * * *